US010528237B2

(12) United States Patent
Bostick et al.

(10) Patent No.: US 10,528,237 B2
(45) Date of Patent: *Jan. 7, 2020

(54) UNIFIED FILTERED SOCIAL MEDIA CONTENT STREAM FOR SINGLE USER INTERFACE ACCESS

(71) Applicant: International Business Machines Corporation, Armonk, NY (US)

(72) Inventors: James E. Bostick, Cedar Park, TX (US); John M. Ganci, Jr., Cary, NC (US); Kimberly G. Starks, Nashville, TN (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 15/811,767

(22) Filed: Nov. 14, 2017

(65) Prior Publication Data

US 2018/0067629 A1    Mar. 8, 2018

Related U.S. Application Data

(63) Continuation of application No. 14/223,264, filed on Mar. 24, 2014, now Pat. No. 9,857,950.

(51) Int. Cl.
*G06F 3/048* (2013.01)
*G06F 3/0484* (2013.01)
*H04L 29/08* (2006.01)

(52) U.S. Cl.
CPC ...... *G06F 3/04842* (2013.01); *H04L 67/2823* (2013.01); *H04L 67/2833* (2013.01); *H04L 67/2838* (2013.01)

(58) Field of Classification Search
None
See application file for complete search history.

(56) References Cited

U.S. PATENT DOCUMENTS

2006/0271560 A1*  11/2006  Mitchell ............. H04L 12/1859
2009/0119167 A1*   5/2009  Kendall ................. G06Q 30/02
                                                                705/14.17

(Continued)

FOREIGN PATENT DOCUMENTS

WO    2011009101 A1    1/2011
WO    2013033818 A1    3/2013
WO    2013177280 A1   11/2013

OTHER PUBLICATIONS

Non Final Office Action dated Jan. 5, 2016 for U.S. Appl. No. 14/223,264, filed Mar. 24, 2014; 18 pages.

(Continued)

*Primary Examiner* — William C Trapanese
(74) *Attorney, Agent, or Firm* — Brian Restauro; Hoffman Warnick LLC

(57) ABSTRACT

A system, method and program product are provided for system for processing a set of social media (SM) streams. A system is disclosed that includes: a user interface for selecting the set of SM streams and for inputting a set of filtering definitions; a stream unification system that creates a single unified stream from the set of SM streams; a content filtering system that selects relevant content items from the single unified stream based on the set of filtering definitions and generates a unified filtered SM stream using selected content items; and an output system that outputs the unified filtered SM stream to a user display.

15 Claims, 3 Drawing Sheets

(56) References Cited

U.S. PATENT DOCUMENTS

| | | |
|---|---|---|
| 2011/0179020 A1 | 7/2011 | Ozzie et al. |
| 2011/0202544 A1* | 8/2011 | Carle .................... H04W 4/02 |
| | | 707/754 |
| 2012/0210253 A1 | 8/2012 | Lunna et al. |
| 2013/0054699 A1 | 2/2013 | Macaskill |
| 2013/0091204 A1* | 4/2013 | Loh .................... G06F 16/958 |
| | | 709/204 |
| 2013/0262476 A1 | 10/2013 | Barak et al. |
| 2013/0297694 A1* | 11/2013 | Ghosh .................... H04L 67/02 |
| | | 709/204 |

OTHER PUBLICATIONS

Final Office Action dated Jun. 17, 2016 for U.S. Appl. No. 14/223,264, filed Mar. 24, 2014; 15 pages.
Non Final Office Action dated Mar. 9, 2017 for U.S. Appl. No. 14/223,264, filed Mar. 24, 2014; 17 pages.
Final Office Action dated Jun. 29, 2017 for U.S. Appl. No. 14/223,264, filed Mar. 24, 2014; 13 pages.
Notice of Allowance and Fee(s) Due dated Aug. 28, 2017 for U.S. Appl. No. 14/223,264, filed Mar. 24, 2014; 28 pages.

* cited by examiner

UNIFIED FILTERED SOCIAL MEDIA CONTENT STREAM FOR SINGLE USER INTERFACE ACCESS

TECHNICAL FIELD

The subject matter of this invention relates generally to social media, and more particularly to an adaptive filter that can be applied to a unified stream of social media content to allow a single user interface to display selected content from a plurality of social media sources.

BACKGROUND

Managing social media content for both individuals and businesses can be overwhelming with the volume of content that is displayed. This problem is multiplied by the number of social media applications (SMAs) that have become mainstream, e.g., FACEBOOK®, TWITTER®, LINKEDIN®, GOOGLE®, etc. The problem is further compounded by the many accounts requiring a unique login and user interface to view content. At present, users of social media have to manage and filter the content separately within each of the social media solutions.

Further, advertisers must essentially deal with each social media provider separately to reach a given user demographic, even though the user demographic may commonly utilize multiple social media providers.

SUMMARY

In general, aspects of the present invention provide a solution for an adaptive filter that can be applied to a unified stream of social media content in which a single user interface (UI) displays content for a plurality of subscribed social media vehicles. The adaptive filter allows the content shown in the unified interface to be limited for a particular purpose and time periods, such as the user's areas of interest of the day. The adaptive filter can be dynamically set to achieve a desired result, e.g., expire, be updated at will, refresh content on demand to allow for changing interests, etc.

A first aspect of the invention provides a system for processing a set of social media (SM) streams, comprising: a user interface for selecting the set of SM streams and for inputting a set of filtering definitions; a stream unification system that creates a single unified stream from the set of SM streams; a content filtering system that selects relevant content items from the single unified stream based on the set of filtering definitions and generates a unified filtered SM stream using selected content items; and an output system that outputs the unified filtered SM stream to a user display.

A second aspect of the invention provides a computer program product stored on computer readable medium, which when executed by a computer system, processes a set of social media (SM) streams, comprising: program code to provide a user interface for selecting the set of SM streams and for inputting a set of filtering definitions; program code that creates a single unified stream from the set of SM streams; program code that selects relevant content items from the single unified stream based on the set of filtering definitions and generates a unified filtered SM stream using selected content items; and program code that outputs the unified filtered SM stream to a user display.

A third aspect of the invention provides a computerized method of that processes a set of social media (SM) streams, comprising: providing a user interface for selecting the set of SM streams and for inputting a set of filtering definitions; creating a single unified stream from the set of SM streams; selecting relevant content items from the single unified stream based on the set of filtering definitions and generating a unified filtered SM stream using selected content items; and outputting the unified filtered SM stream to a user display.

BRIEF DESCRIPTION OF THE DRAWINGS

These and other features of this invention will be more readily understood from the following detailed description of the various aspects of the invention taken in conjunction with the accompanying drawings in which.

Figure 1:
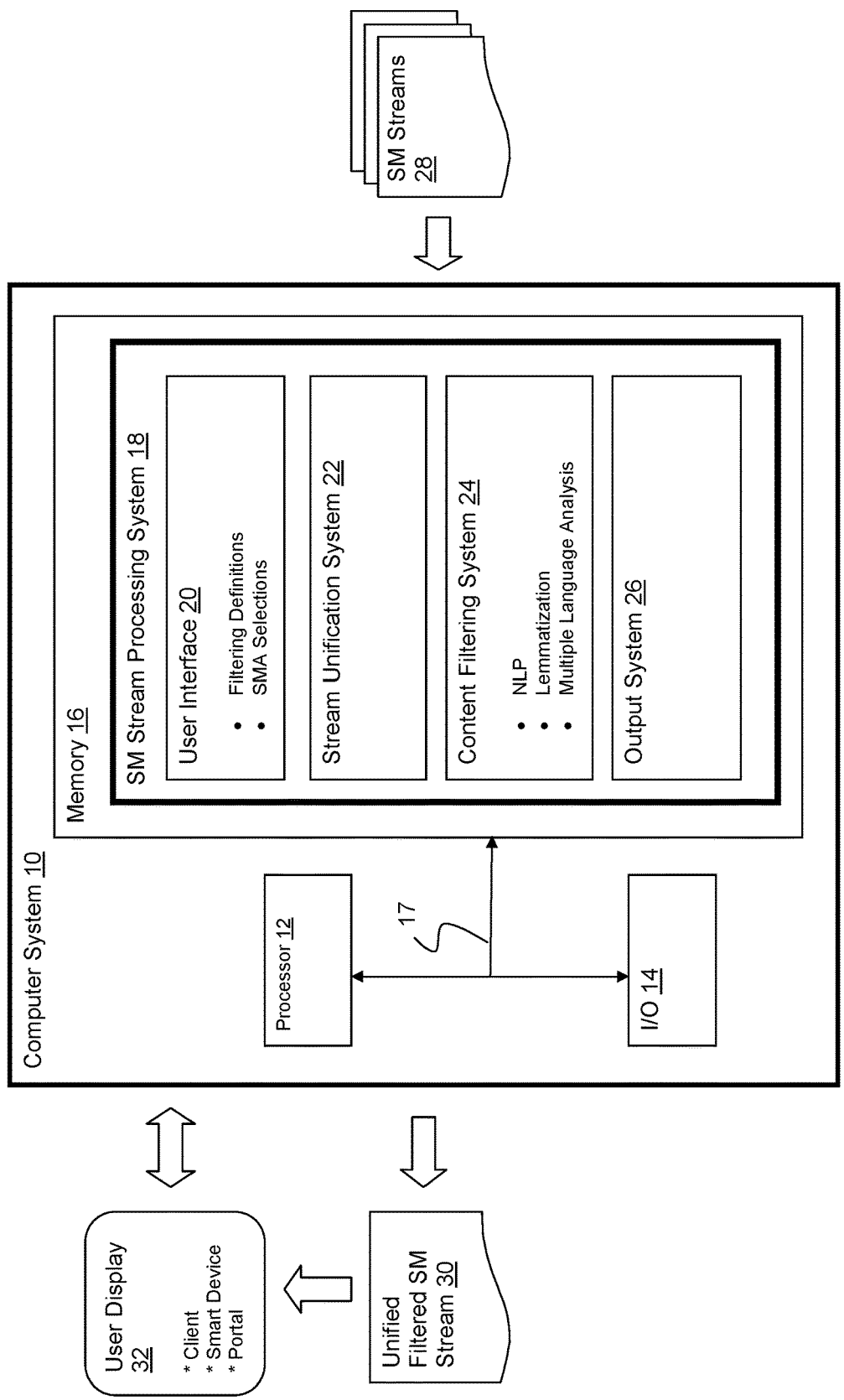
FIG. 1 shows an illustrative computer system having a social media (SM) stream processing system according to embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

FIG. 1 depicts a computer system 10 having a social media (SM) stream processing system 18 that processes a set of SM streams 28 and generates a unified filtered SM stream 30. In this example, the unified filtered SM stream 30 is outputted from the computer system 10 to a user display 32, such as that provided by a client program or system, a smart device, a portal, etc. In an alternative embodiment, SM stream processing system 18 and user display 32 may be integrated into a single device, such as a smart device. Regardless, the unified filtered SM stream 30 includes a single stream of content items selected from the inputted set of SM streams 28. The resulting content items appearing in the unified filtered SM stream 30 are selected based on an adaptive filtering process defined, e.g., by an end user.

In general, SM stream processing system 18 includes: (1) a user interface 20 for allowing an end user to select a set of social media applications (SMAs) of interest, e.g., FACEBOOK, TWITTER, etc., and generate a set of filtering definitions; (2) a stream unification system 22 that interleaves content items from the selected set of SM streams 28 into a single unified stream; (3) a content filtering system 24 that filters the single unified stream based on generated filtering definitions; and (4) an output system 26 that formats and outputs the unified filtered SM stream 30 for the user display 32.

User interface 20 may comprise any system for receiving user inputs to define a set of SM applications to be included, and for generating filtering definitions. For example, user interface 20 may include drop-down menus to select a plurality of SM applications, dialog boxes to enter keywords, radio buttons to select a time period, etc. For instance, the user may utilize a dropdown box to select FACEBOOK, TWITTER and LINKEDIN as its SMAs of interest and enter one or more keywords in a dialog box to define a desired subject matter area, e.g., "NFL Football." In addition, the user may enter username and password information for each SM application.

Figure 2:
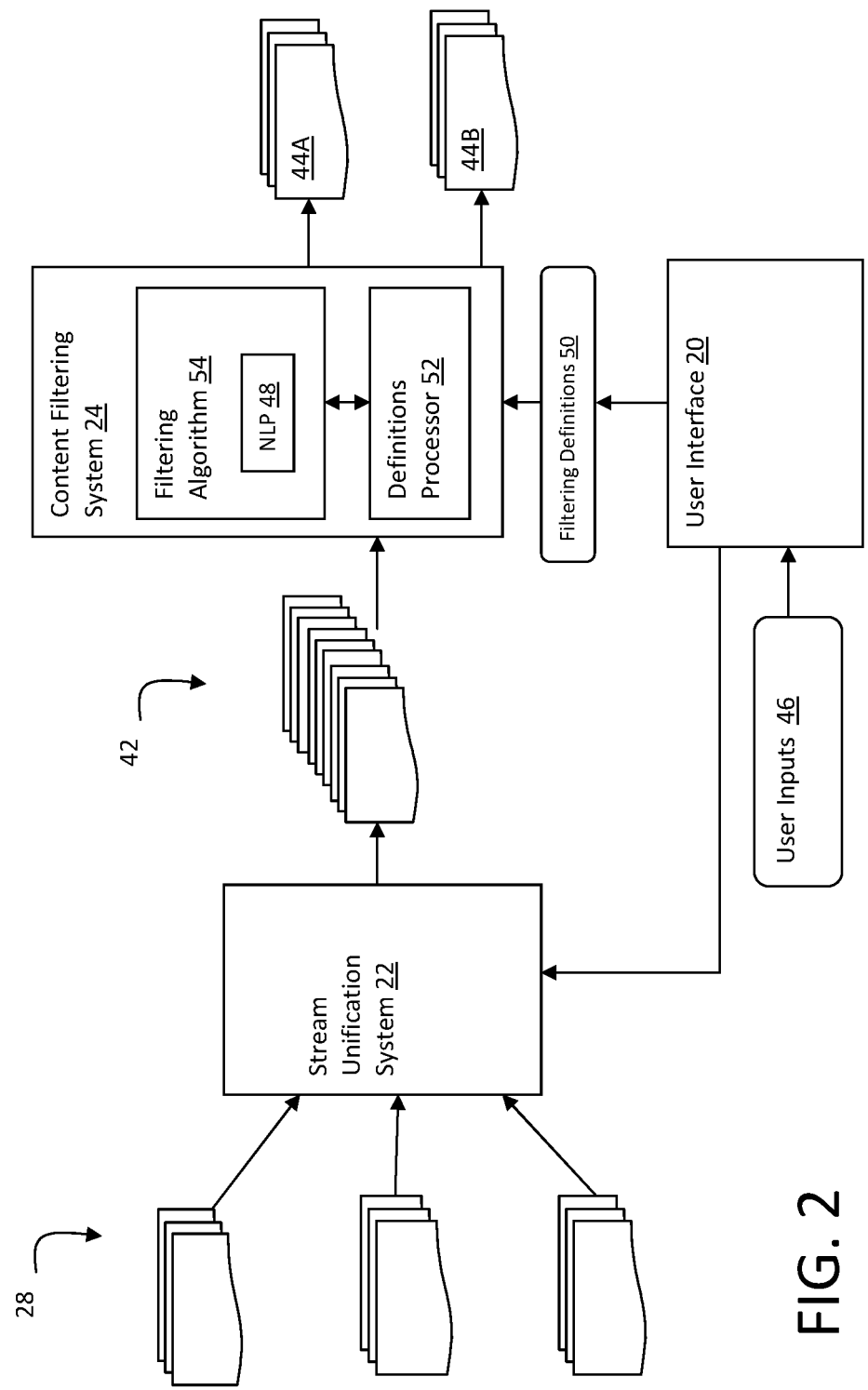
FIG. 2 shows an illustrative SM stream processing flow according to embodiments of the invention.

FIG. 2 depicts an illustrative flow diagram of a process of generating a pair of unified filtered SM streams 44A, B from a selected set of SM streams 28. As noted, stream unification system 22 unifies (e.g., interleaves, collates, etc.) content items from the selected set of SM streams 28 to generate a single unified stream 42. Any process or criteria may be utilized to unify the content items, e.g., first-in first-out, etc., and the single unified stream 42 may be stored or managed in any manner, e.g., in a cache. Once the single unified stream 42 is generated, content filtering system 24 identifies and selects content items that correlate with a set of filtering definitions 50, e.g., provided by an end-user.

In one embodiment, filtering definitions 50 are determined via a user interface based on user inputs 46. For example, an end user may want to see a first stream of football related content for today and a second stream of vacation deals in the Caribbean for the next week. Using tools (e.g., drop down boxes, dialog windows, etc.) provided in the user interface 20, a set of filtering definitions 50 can be generated, e.g., in the form of a data structure, such as:

```
<Definitions>
    <Stream 1>
        <Key Term> "Football"
        <Time Period> 1 Day
    <Stream 2>
        <Key Term 1> Vacation Deals
        <Key Term 2> Caribbean
        <Time Period> 1 Week
<End>
```

Once created, a definitions processor 52 is employed to evaluate the filtering definitions 50. Definitions processor 52 might for example analyze the data structure to determine the number of output streams 44A, 44B required, determine the duration/time period of the output streams 44A, 44B, and provide keywords to a filtering algorithm 54 to filter the single unified stream 42 into the desired output streams 44A, 44B. In the example described, a first output stream 44A contains football related content items and is generated for one day; and a second output stream 44B contains Caribbean vacation deal content and is generated for one week.

Filtering algorithm 54 may employ any technique for identifying relevant content items from the unified single stream 42. For example, filtering algorithm 54 may look for keywords in the unified single stream 42, as provided by the filtering definitions 50. The keywords may be searched in the content itself (e.g., user comments in a FACEBOOK or TWITTER post), in metadata associated with each content item, in hash tags, etc.

In a further embodiment, a natural language processor (NLP) 48 may be employed to parse language content extracted from the unified single stream 42. Content items in the unified single stream 42 will typically comprise various types of language content including: comments, tweets, titles, passages, metadata, etc. NLP 48 can break down sentence structures in the language content to more accurately understand the content and determine if the content correlates to a desired subject matter area.

In a further embodiment, techniques such as lemmatization may be employed by the filtering system 54. Lemmatization is the process of grouping together different inflected forms of a word so that the group of words can be analyzed as a single item. This allows a better chance for the filter to work in spite of variations of input. For example, "walking," "walks," "walked," all have a lemma of "walk." Accordingly, content items having any of these variations could be identified as relevant to a subject matter topic involving "walking." Along these same lines, a multi-language processor may also be utilized to recognize and correlate language content in different languages.

Ontology driven techniques (a model for describing the world that consists of a set of types, properties and relationship types) could also be used.

Further, embodiments could be implemented to use analytics to mine the single stream of social media 42 using "triples". A triple is the functional decomposition of any sentence. The triple is composed of a subject→predicate→object. For example, the predicate is the main verb of the sentence, the object is the direct object of that verb (the action recipient), and the subject is verb agent; the one who carries out the action. By decomposing language into triples the filtering algorithm 54 can better understand how entities relate to each other and navigate through unstructured text (e.g., via a triple store). In this case, all of the language content from the single stream of social media 42 could be broken down into triples and stored in a triple store. An analysis process would then analyze the data in the triple store to determine relevance to a predetermined subject matter area.

Figure 3:
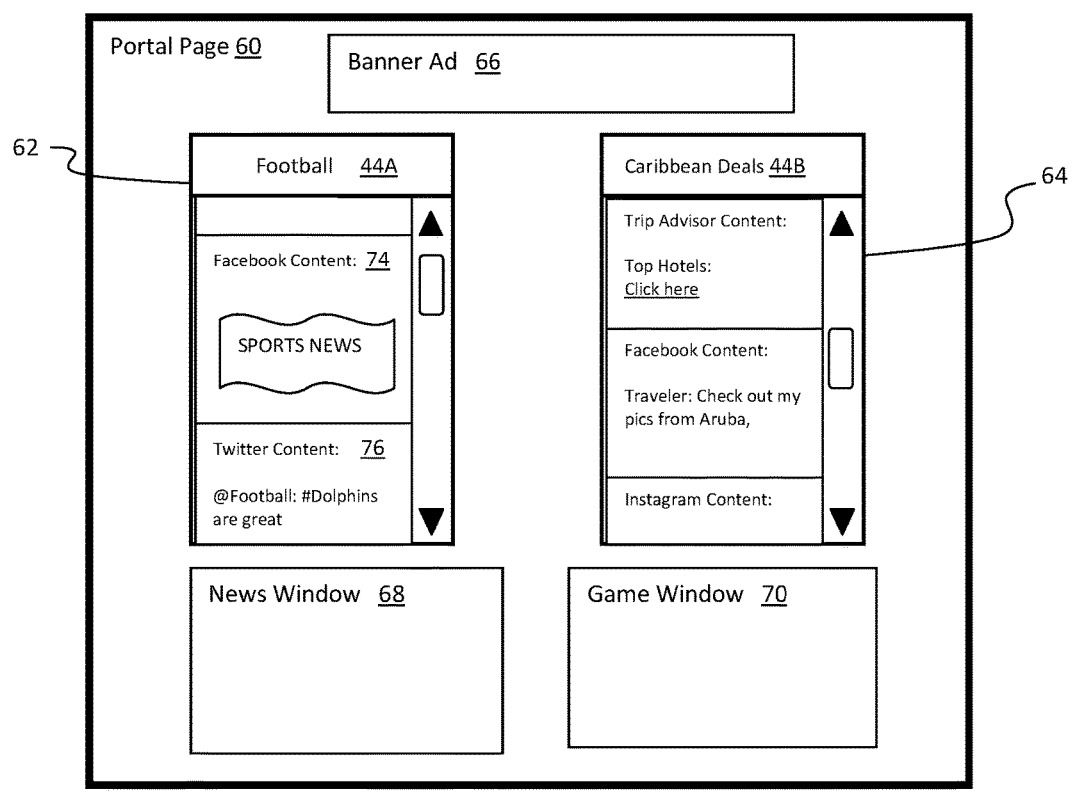
FIG. 3 shows a portal page according to embodiments of the invention.

FIG. 3 depicts an illustrative portal page 60 that has been arranged to display unified filtered SM streams 44A, 44B in SM windows 62, 64, respectively. Portal page 60 may for example comprise any type of configurable web portal page, such as that provided by My Yahoo™. Thus, although shown with two SM windows 62, 64, portal page 60 could be dynamically configured to display any number of SM windows for a user. As such, SM windows 62, 64 may automatically appear and be removed based on time period constraints provided by the user. For example, in the case above, the user requested a football stream for one day. Accordingly, window 62 could be generated and displayed for 24 hours and then removed.

As shown, portal page 60 may also include other user defined windows commonly found in configurable portals, such as a news window 68, game window 70 and a banner ad 66. Note that ad content displayed in banner ad 66 may be based on keywords used to filter the unified filtered SM streams 44A, 44B. Thus, advertising could me much more focused and timely.

In the example shown in FIG. 3, SM window 62 includes a header bar that shows a reference term (e.g., "Football"), and a stream of content items. In this embodiment, a scrolling window is utilized that allows the user to view correlated content items 74, 76 from selected social media applications. It is understood that any type of display or interface could be utilized to show one or more unified filtered SM streams. As noted, unified filtered SM streams could likewise be displayed on a smart device. In the case where multiple streams are requested by the user on a smart device, an APP on the smart device could include a mechanism for switching between streams.

In a further embodiment, user interface 20 (FIG. 1) may also include a natural language (NL) processor for receiving NL inputs from a user. Thus, rather than utilizing drop down boxes and the like, the user could simply utter NL passages. The NL processor may include a disambiguation process that learns or interfaces with a user to extract relevant information. The NL processor may interact with the end user to better extract relevant information. For instance, the user may utter, "show me a stream of football content." The NL processor may respond with a query, "do you want to search all available social medial applications?", or "Do you mean American Football or Soccer?" The end user could then respond as necessary.

Referring again to FIG. 1, illustrative computer system 10 may comprise any type of computing device which, for example includes at least one processor 12, memory 16, an input/output (I/O) 14 (e.g., one or more I/O interfaces and/or devices), and a communications pathway 17. In general, processor(s) 12 execute program code, such as SM stream processing system 18, which is at least partially fixed in memory 16. While executing program code, processor(s) 12 can process data, which can result in reading and/or writing transformed data from/to memory 16 and/or I/O 14 for further processing. Pathway 17 provides a communications link between each of the components in computer system 10. I/O 14 can comprise one or more human I/O devices, which enable a user to interact with computer system 40. To this extent, SM stream processing system 18 can manage a set of interfaces (e.g., graphical user interfaces, application program interfaces, etc.) that enable humans and/or other systems to interact with the SM stream processing system 18. Further, SM stream processing system 18 can manage (e.g., store, retrieve, create, manipulate, organize, present, etc.) data, such as SM streams 28, using any solution.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system including a processor for processing a set of social media (SM) streams, comprising:
    a user interface for selecting a plurality of different SM streams to form the set of SM streams;
    a stream unification system for creating a single unified stream by interleaving the set of SM streams;
    a content filtering system for selecting content items from the single unified stream based on a plurality of filtering definitions input by a user, and for generating a unified filtered SM stream for each filtering definition in the plurality of filtering definitions input by the user using the selected content items, wherein each filtering definition input by the user includes a time period during which the unified filtered SM stream is to be displayed; and
    an output system for outputting each unified filtered SM stream to a user display, by displaying a separate window on a portal page for each unified filtered SM stream, each window displaying a respective unified filtered SM stream on the portal page only for the time period included in the filtering definition used to generate the unified filtered SM stream, and adding the window to the portal page at a start of the time period and removing the window from the portal page at an end of the time period, wherein the output system also displays an advertising banner on the portal page, the advertising banner
    displaying advertising content based on the plurality of filtering definitions input by the user.

2. The system of claim 1, wherein the content filtering system includes a natural language processor for analyzing language content extracted from the single unified stream.

3. The system of claim 1, wherein the content filtering system selects content items based on keywords provided by the filtering definitions.

4. The system of claim 3, wherein the filtering system further employs lemmatization to group together different inflected forms of a keyword.

5. The system of claim 1, wherein the user display comprises a smart device.

6. A computer program product stored on computer readable storage medium, which when executed by a computer system, performs a method for processing a set of social media (SM) streams, the method comprising:
    selecting, using a user interface, a plurality of different SM streams to form the set of SM streams;
    creating a single unified stream by interleaving the set of SM streams;
    selecting content items from the single unified stream based on a plurality of filtering definitions input by a user, and generating a unified filtered SM stream for each filtering definition in the plurality of filtering definitions input by the user using the selected content items, wherein each filtering definition input by the user includes a time period during which the unified filtered SM stream is to be displayed; and
    outputting each unified filtered SM stream to a user display by displaying a separate window on a portal page for each unified filtered SM stream, each window displaying a respective unified filtered SM stream on the portal page only for the time period included in the filtering definition used to generate the unified filtered SM stream, adding the window to the portal page at a start of the time period and removing the window from the portal page at an end of the time period, and displaying an advertising banner on the portal page, the advertising banner displaying advertising content based on the plurality of filtering definitions input by the user.

7. The computer program product of claim 6, the method further comprising analyzing language content extracted from the single unified stream using a natural language processor.

8. The computer program product of claim 6, the method further comprising selecting content items based on keywords provided by the filtering definitions.

9. The computer program product of claim 8, the method further comprising employing lemmatization to group together different inflected forms of a keyword.

10. The computer program product of claim 6, wherein the user display comprises a smart device.

11. A computer-implemented method for processing a set of social media (SM) streams, comprising:
    selecting, using a user interface, a plurality of different SM streams to form the set of SM streams;
    creating a single unified stream by interleaving the set of SM streams; selecting content items from the single unified stream based on a plurality of filtering definitions input by a user, and generating a unified filtered SM stream for each filtering definition in the plurality of filtering definitions input by the user using the selected content items, wherein each filtering definition input by the user includes a time period during which the unified filtered SM stream is to be displayed; and
    outputting each unified filtered SM stream to a user display by displaying a separate window on a portal page for each unified filtered SM stream, each window displaying a respective unified filtered SM stream on the portal page only for the time period included in the filtering definition used to generate the unified filtered SM stream, adding the window to the portal page at a start of the time period and removing the window from the portal page at an end of the time period, and displaying an advertising banner on the portal page, the advertising banner displaying advertising content based on the plurality of filtering definitions input by the user.

12. The computer-implemented method of claim 11, the method further comprising analyzing language content extracted from the single unified stream using a natural language processor.

13. The computer-implemented method of claim 11, the method further comprising selecting content items based on keywords provided by the filtering definitions.

14. The computer-implemented method of claim 13, the method further comprising employing lemmatization to group together different inflected forms of a keyword.

15. The computer-implemented method of claim 11, wherein the user display comprises a smart device.

* * * * *